United States Patent [19]
Eller

[11] 3,831,793
[45] Aug. 27, 1974

[54] TRUCK TIRE SPARE CARRIER
[76] Inventor: Dennis E. Eller, 331 N. Thovington, Algona, Iowa 50511
[22] Filed: Oct. 2, 1972
[21] Appl. No.: 294,266

[52] U.S. Cl............................. 214/454, 224/42.21
[51] Int. Cl............................................. B62d 43/00
[58] Field of Search ......... 214/454, 451; 224/42.06, 224/42.21, 42.14, 42.2, 29

[56] References Cited
UNITED STATES PATENTS

| | | |
|---|---|---|
| 1,315,147 | 9/1919 | Morgan.............................. 214/454 |
| 2,383,476 | 8/1945 | Falslev............................... 214/454 |
| 2,936,918 | 5/1960 | Vais.................................... 214/454 |
| 3,187,914 | 6/1965 | Peras ................................. 224/42.21 |
| 3,613,971 | 10/1971 | Betz.................................... 224/42.06 |

FOREIGN PATENTS OR APPLICATIONS
373,850   6/1932   Great Britain...................... 224/29

Primary Examiner—Robert J. Spar
Assistant Examiner—John Mannix
Attorney, Agent, or Firm—Clarence A. O'Brien; Harvey B. Jacobson

[57] ABSTRACT

A spare tire support for vehicles such as trucks and the like has a supporting frame including an arcuate member mounted substantially between its end portions to a chassis of a vehicle by means of a hanger bracket, and arranged for swinging movement beneath the chassis between a loading and unloading position, and a storage position. Clamp elements pivotally mounted on the end portions of the arcuate member cooperate with associated cantilevers mounted on the chassis to selectively retain the frame in its storage position. Coiled springs are connected to and extended between the hanger bracket and the arcuate member for counterbalancing at least a portion of the weight of the frame and a vehicle tire supported by the frame and bias the frame toward its storage position.

17 Claims, 4 Drawing Figures

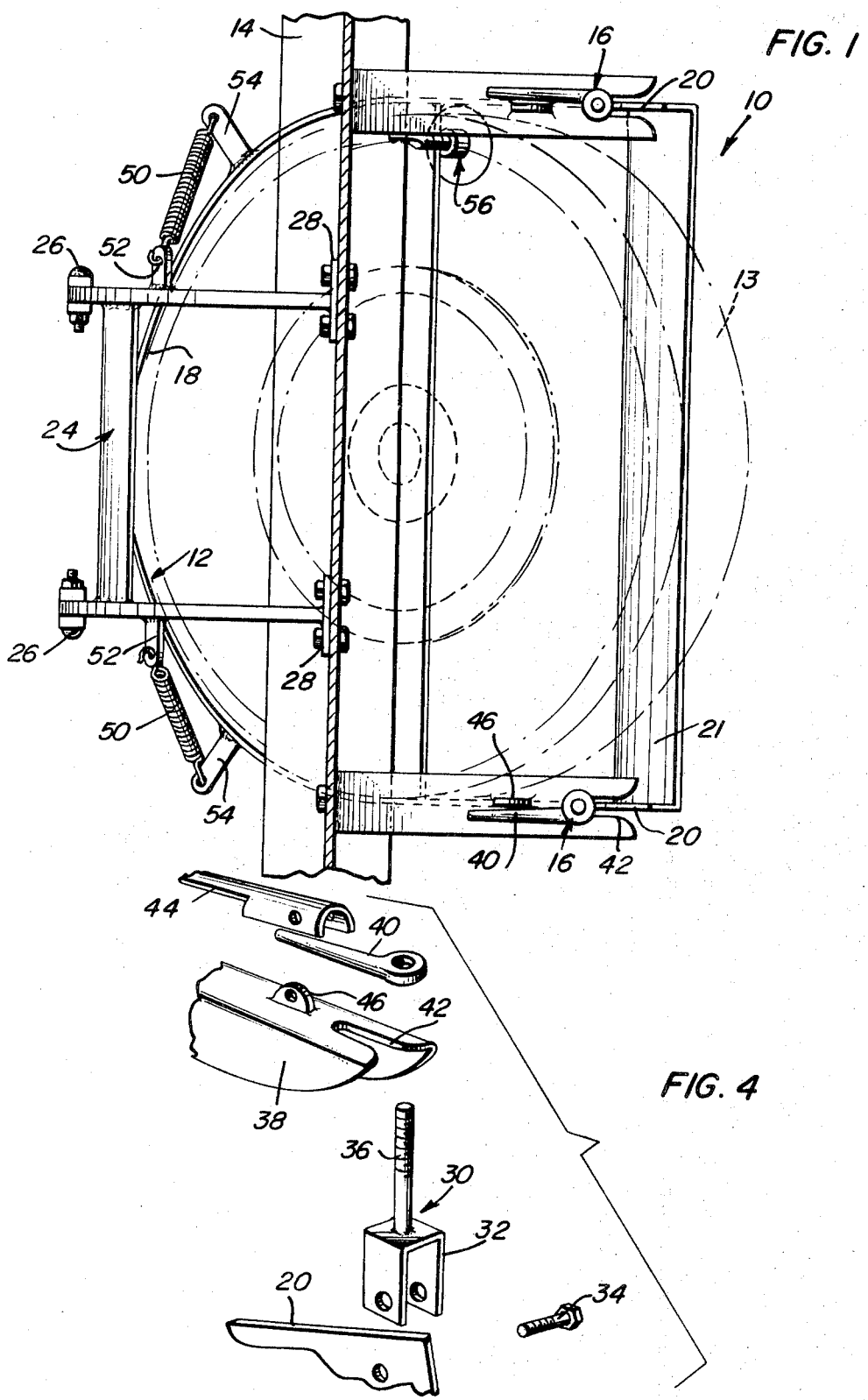

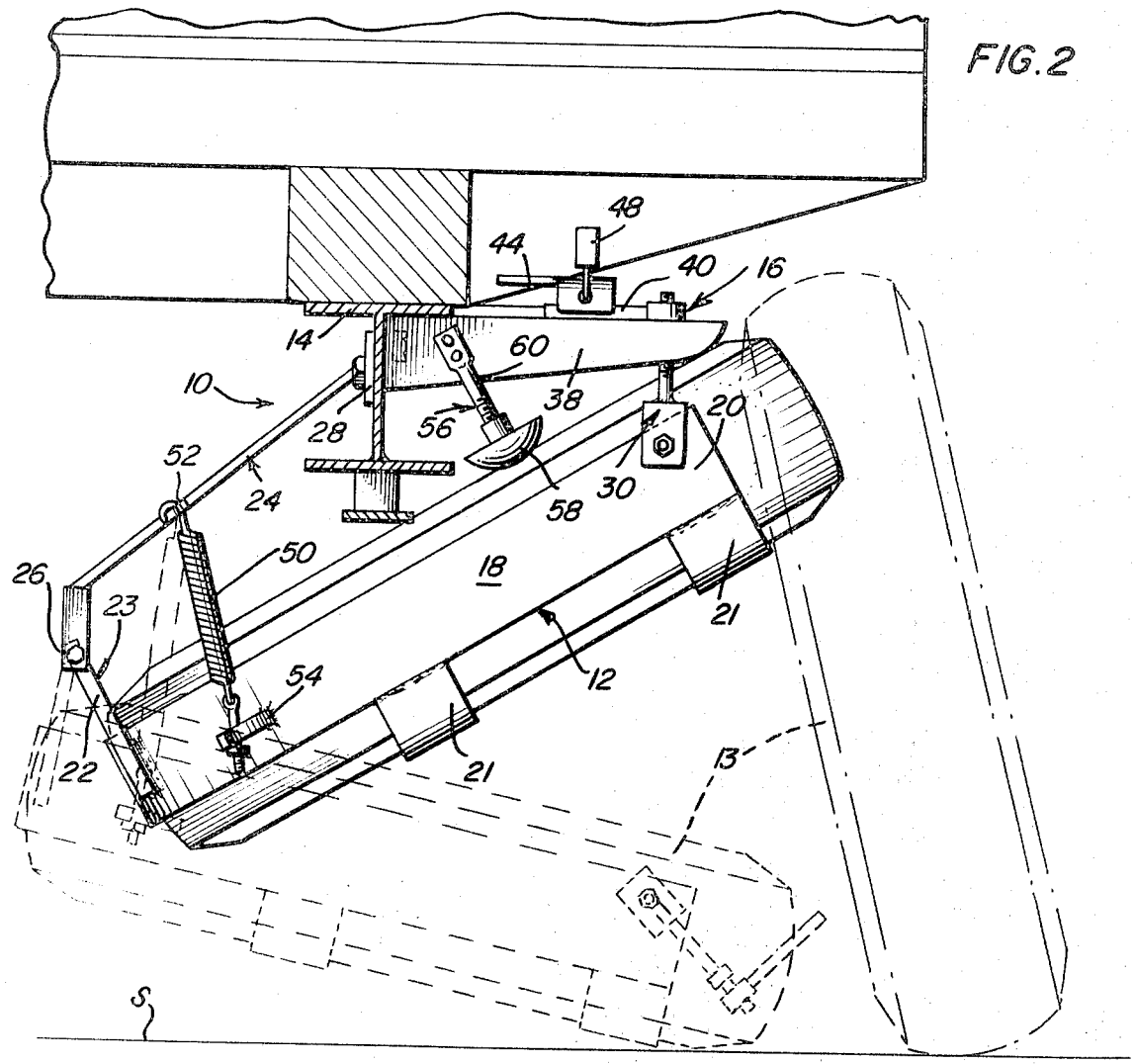
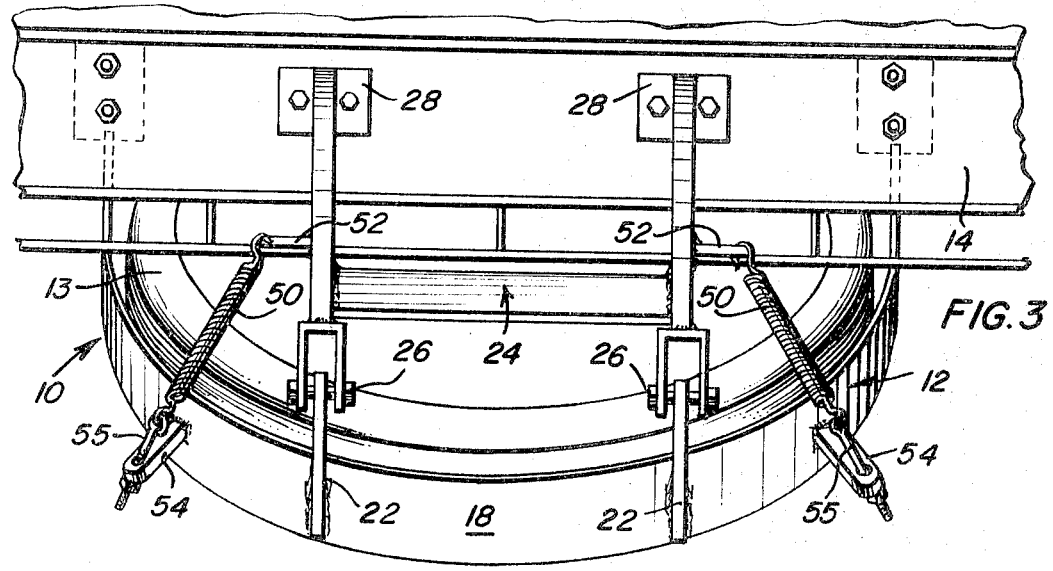

3,831,793

TRUCK TIRE SPARE CARRIER

BACKGROUND OF THE INVENTION

1. Field of the Invention

This invention relates generally to spare tire carriers for vehicles, and in particular to such a carrier for a truck and the like.

2. Description of the Prior Art

It is known to support a spare tire beneath the chassis of a vehicle. An example of apparatus for this purpose may be found in U.S. Pat. No. 3,187,914, where a casing supporting the tire swings about a pair of pivots. However, this known arrangement has the tire substantially parallel to a surface supporting the vehicle when the casing is in its loading and unloading position. When large tires of the 7.00 to 10.00 size commonly used on trucks and the like are involved, unloading of the tire can be a strenuous matter, especially for one man.

SUMMARY OF THE INVENTION

It is an object of the present invention to provide a spare tire support suitable for handling tires for trucks and the like.

It is another object of the present invention to provide a spare tire support that will securely support a readily accessible truck tire in a manner which will not interfere with overall operation of the truck, trailer, and the like.

It is yet another object of the present invention to provide a spare tire support which can be easily manipulated by one man.

These and other objects are achieved according to the present invention by providing a spare tire support having a tire supporting frame mountable on a vehicle chassis for swinging about a single pivot and moving between a loading and unloading position at an angle to a vehicle supporting surface, and a storage position. The frame is selectively retainable in its storage position.

According to a preferred embodiment of the present invention, the frame has an arcuate member with spaced end portions. A pair of spaced members are affixed to the arcuate member substantially equidistant between the end portions to form a mounting bracket, and a hanger bracket affixable to so as to extend from a chassis is pivotally connected to the spaced members of the mounting bracket.

Hanger members are preferably arranged at the end portions of the arcuate member. Each hanger member preferably has a clevis pivotally mounted to an associated end portion, and a threaded rod extending from the clevis. Cantilevers mountable on the chassis are associated with the hanger members, and are provided with slots for receiving the threaded rods. Nuts in the form of longitudinally extending members provided with threaded holes threadingly engage the threaded rods for selectively abutting the cantilevers and clamping the arcuate member to the vehicle chassis.

A pair of springs are advantageously connected to and extended between the hanger bracket and the arcuate member, and arranged embracing the mounting and hanger brackets. These springs counterbalance at least a portion of the weight of the frame and a vehicle tire supported thereby and bias the frame toward its storage position.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary, horizontal sectional view showing a spare tire support according to the present invention mounted on a chassis beam;

FIG. 2 is a fragmentary, vertical sectional view showing the spare tire support of FIG. 1;

FIG. 3 is a fragmentary, front elevational view showing the spare tire support of FIGS. 1 and 2; and FIG. 4 is a fragmentary, exploded perspective view, drawn to a larger scale than FIGS. 1 to 3, showing a detail of storage position retaining apparatus of the spare tire support of FIGS. 1 to 3.

DESCRIPTION OF THE PREFERRED EMBODIMENTS

FIGS. 1 to 3 of the drawings show a preferred embodiment of a spare tire support 10 according to the present invention. This support 10 has a frame 12 arranged for supporting a tire 13, and mountable to the underside of a, for example, I-beam 14 of a vehicle chassis for swinging about a pivot and moving between a loading and unloading position at an angle to a vehicle supporting surface S, as shown by the broken lines in FIG. 2, and a storage position shown by the full lines in FIG. 2. Clamp arrangements 16 permit frame 12 to be selectively retained in its storage position.

Frame 12 is formed by an arcuate member 18 having spaced end portions 20 and a pair of straps 21. Clamp arrangements 16 are partially arranged at end portions 20, as will be set out in detail below. A pair of spaced members 22 are affixed to member 18 as by, for example, welding and are arranged subsantially equidistant between end portions 20 to form mounting bracket 23 (FIG. 2). A hanger bracket 24 affixable to and extending below beam 14 is pivotally connected to members 22 of bracket 23 as by pins 26 for mounting frame 12 to the vehicle chassis. Bracket 24 may be connected to beam 14 in a conventional manner, such as by means of bolted flanges 28.

Clamp arrangements 16 each has a hanger member 30 formed by a clevis 32 (FIG. 4) pivotally mounted to an associated end portion 20 as by a pin 34 arranged in aligned holes in the elements. A threaded rod 36 extends from clevis 32 to complete member 30. A cantilever 38 is associated with each member 30, and an element provided with a threaded hole such as a handle-nut 40 threadingly engages rod 36 and selectively abuts cantilever 38 while rod 36 is arranged in a slot 42 provided in cantilever 38 for clamping frame 12 to the chassis and retaining same in its storage position.

If desired, a cover 44 may be selectively attached as by a retaining pin 48 (FIG. 2) to an ear 46 provided on cantilever 38 to retain nut 40 in a predetermined position as by embracing its handle portion. A locknut (not shown) may be arranged on rod 36 beneath and abutting cantilever 38 to further secure arrangement 16.

Springs such as helical coiled springs 50 are connected to an associated ear 52 projecting from the clevis carrying elements of hanger bracket 24 and a lug 54 projecting from arcuate member 18 so as to extend between these parts and counterbalance at least a portion of the weight of frame 12 and tire 13 for biasing frame 12 toward its storage position. These springs 50 are advantageously arranged embracing brackets 22 and 24 in the manner shown in the drawings, and are adjustable as by eye bolts 55.

A snug bracket 56 may be affixed to one or both cantilevers 38 in a suitable, known manner, and arranged for frictionally engaging tire 13 when frame 12 is in its storage position and firmly hold tire 13 in place. Snug bracket 56 may have, as shown in FIG. 2, a head portion 58 provided with a threaded bore which adjustably cooperates with a threaded shaft 60 to vary the pressure exerted by bracket 56 on tire 13. This feature also provides for flexibility as to the size and degree of inflation of a particular tire 13 to be supported.

As can best be appreciated from FIG. 2 of the drawings, the outer edge of tire 13 is advantageously only about an inch from the edge of the vehicle chassis when in the stored or full line position. This arrangement will allow for easy access to tire 13 and facilitate its removal and replacement.

To remove a tire 13 from support 10, first remove cover 44 to unlock nut 40 and remove threaded rod 36 from slot 42. Frame 12 can now be eased downwardly to the broken line position in FIG. 2 with a slight pressure of one's foot or hand. The person manipulating frame 12 may now pull tire 13 forward, or to the right as seen in FIG. 2, out of frame 12 a slight amount of, for example, 3 or 4 inches. This will cause tire 13 to stand up as frame 12 swings back up to its storage, or full line position as seen in FIG. 2. To load a tire 13 in support 10, roll a tire 13 into position in front of frame 12. Lean tire 13 against frame 12 as is shown in FIG. 2. Lower frame 12 with a slight pressure of the foot or hand. As frame 12 is lowered, tire 13 will lay back on it. Now slide tire 13 back into place on frame 12, and lift frame 12 slightly to bring it back up into its storage position. Place nuts 40 on rod 36 and tighten down. Replace cover 44 and secure same as by, for example, a padlock (not shown).

A support 10 according to the present invention may be constructed in a known manner from conventional materials such as, for example, aluminum, steel, and the like.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A spare tire support for vehicles, comprising, in combination:
    a. a supporting frame including an arcuate member having spaced end portions;
    b. means for mounting the frame to a vehicle chassis for swinging about a pivot and moving between a loading and unloading position, and a storage position, the mounting means including a mounting bracket affixed to the arcuate member substantially equidistant between the end portions, and a hanger bracket affixable to and extending from a chassis and pivotally connected to the mounting bracket;
    c. means for selectively retaining the frame in the storage position, and the retaining means being partially arranged at one of said end portions and including a hanger member having a clevis pivotally mounted to the one end portion and a threaded rod extending from the clevis, a cantilever mountable on the chassis, and an element provided with a threaded hole for threadingly engaging the rod and selectively arrangeable abutting the cantilever; and
    d. a snug bracket affixed to one of the cantilevers and arranged for frictionally engaging a tire when the frame is in storage position and firmly holding the tire.

2. A structure as defined in claim 1, wherein the frame further includes at least one supporting strap connected to and extending across the arcuate member.

3. A structure as defined in claim 1, wherein each end portion of the arcuate member has connected thereto a hanger member, and associated therewith a cantilever and abutting element.

4. A structure as defined in claim 1, further including means for counterbalancing at least a portion of the weight of the frame and a vehicle tire supported thereby for biasing the frame toward the storage position.

5. A structure as defined in claim 4, wherein the counterbalancing means is a spring connected to and extending between the hanger bracket and the arcuate member.

6. The structure as defined in claim 5, wherein there is a pair of springs embracing the mounting and hanger brackets.

7. A spare tire support for vehicles, comprising, in combination:
    a. a supporting frame including an arcuate member having spaced end portions,
    b. means for mounting the frame to a vehicle chassis for swinging about a pivot and moving between a loading and unloading position, and a storage position, the retaining means including a hanger member having a clevis pivotally mounted to the one end portion and a threaded rod extending from the clevis, a cantilever mountable on the chassis, and an element provided with a threaded hole for threadingly engaging the rod and selectively arrangeable abutting the cantilever,
    c. means for selectively retaining the frame in the storage position, each end portion of the arcuate member having connected thereto a hanger member, and associated therewith a cantilever and abutting element.

8. A structure as defined in claim 7, wherein the mounting means includes a mounting bracket affixed to the arcuate member substantially equidistant between the end portions, and a hanger bracket affixable to and extending from a chassis and pivotally connected to the mounting bracket.

9. A structure as defined in claim 8, wherein the retaining means is partially arranged at one of said end portions.

10. A structure as defined in claim 9, wherein the retaining means includes a hanger member having a clevis pivotally mounted to the one end portion and a threaded rod extending from the clevis, a cantilever mountable on the chassis, and an element provided with a threaded hole for threadingly engaging the rod and selectively arrangeable abutting the cantilever.

11. A structure as defined in claim 7, further including a snug bracket affixed to one of the cantilevers and arranged for frictionally engaging a tire when the frame is in storage position and firmly holding the tire.

12. A structure as defined in claim 7, wherein the frame further includes at least one supporting strap connected to and extending across the arcuate member.

13. A structure as defined in claim 7, further including means for counterbalancing at least a portion of the weight of the frame and a vehicle tire supported thereby for biasing the frame toward the storage position.

14. A structure as defined in claim 13, wherein the counterbalancing means is a spring connected to and extending between the hanger bracket and the arcuate member.

15. A structure as defined in claim 14, wherein there is a pair of springs embracing the mounting and hanger brackets.

16. A spare tire support for vehicles, comprising, in combination:
    a. a supporting frame including an arcuate member having spaced end portions;
    b. means for mounting the frame to a vehicle chassis for swing about a pivot between the spaced ends and moving between a loading and unloading position, and a storage position; and
    c. means for selectively retaining the frame in the storage position, the retaining means including a hanger member, a cantilever mountable on the chassis, and a retaining element provided with means for selectively engaging the hanger member and attaching same to the cantilever, the hanger member being connected to an end portion of the arcuate member,
    d. the retaining means further including the hanger member having a clevis pivotally mounted to the one end portion and a threaded rod extending from the clevis, and an element provided with a threaded hole for threadingly engaging the rod and selectively arrangeably abutting the cantilever.

17. A structure as defined in claim 16, wherein the retaining means includes a pair of hanger members and associated retaining elements and cantilevers, each end portion of the arcuate member having connected thereto a hanger member and associated therewith a cantilever and retaining element.

* * * * *